Sept. 21, 1965     W. SCHELKMANN     3,207,647
ENCLOSURE FOR FLUID-TIGHTLY ENCLOSING AT LEAST A PORTION OF
A TIRE TO BE REPAIRED DURING VULCANIZATION OF
A RUBBER PORTION TO THE TIRE
Filed Feb. 6, 1963
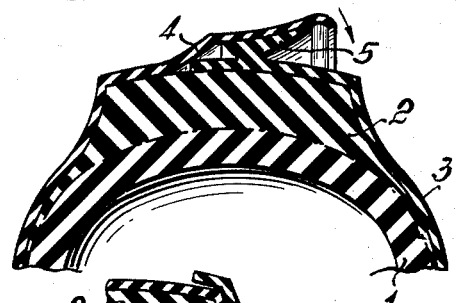
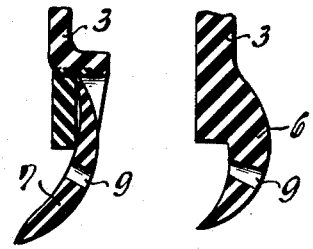
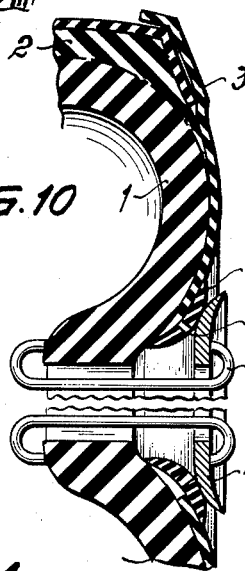
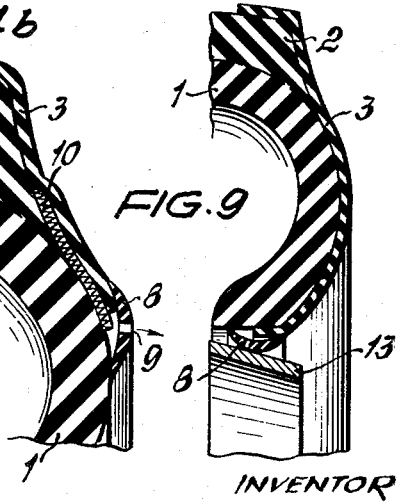
INVENTOR
WILHELM SCHELKMANN
BY
Michael S. Striker
ATTORNEY United States Patent Office 3,207,647
Patented Sept. 21, 1965

3,207,647
ENCLOSURE FOR FLUID-TIGHTLY ENCLOSING AT LEAST A PORTION OF A TIRE TO BE REPAIRED DURING VULCANIZATION OF A RUBBER PORTION TO THE TIRE
Wilhelm Schelkmann, Crengeldanzstrasse 85, Witten (Ruhr), Germany
Filed Feb. 6, 1963, Ser. No. 256,725
Claims priority, application Germany, Feb. 6, 1962, Sch 30,940
11 Claims. (Cl. 156—394)

The present invention relates to enclosures for fluid-tightly enclosing at least a portion of a tire to be repaired during vulcanization of a rubber portion to the tire and especially during vulcanization of a tread portion to the outer surface of a worn tire.

During repair of a damaged or worn tire the piece to be vulcanized to the tire is usually pressed against a tire surface to assure a proper bond between the tire and the material to be vulcanized thereto. To produce a bond between the tire and the layer of rubber vulcanized thereto free of any air enclosures, it is also preferred to air-tightly enclose the tire and the material to be vulcanized thereto and to evacuate then the air in the enclosure. Various enclosures are known for this purpose, but the known enclosures are difficult to apply about the tire and the material to be vulcanized thereto in such a manner that the enclosure will form an air-tight seal and so that the interior of the enclosure can be properly evacuated to provide a bond between the tire and the material to be vulcanized thereto which is substantially free of any air enclosures. Enclosures are known which consist of a flexible cover which is preferably U-shaped and cover the outside as well as the inside of a tire and a tread portion superimposed on the outer worn surface of the tire and which is wrapped around the assembly formed by the tire, the tread portion thereon and any layer of binding material sandwiched between the tread portion and the tire. The cover is wrapped around the assembly so that the edge portions of the cover overlap to a considerable extent and these edge portions are then held in abutting relationship to the remainder of the cover by clamps or rubber bands placed thereon. Valve openings are formed at appropriate places of the cover and, after the latter is tightly wrapped about the assembly, air is evacuated from the interior of the cover. This known enclosure has the disadvantage that the whole tire as well as any repair material placed thereon has to be completely enclosed, which is rather cumbersome, especially if only a relatively small patch of repair material has to be vulcanized to the tire. Another disadvantage of this known enclosure is that during evacuation of air from the interior of the cover through the various valve openings provided therein, there will be created in the interior of the cover around the valve opening such a vacuum which will tend to suck the flexible material about the valve opening tightly against the tire surface so that portions of the interior of the cover more distant from the valve opening will not be properly evacuated any longer.

It is an object of the present invention to overcome the disadvantages of flexible covers for the aforementioned purpose known in the art.

It is an additional purpose of the present invention to provide an enclosure which may form a fluid-tightly sealed cover for only a portion of a tire and the repair material placed thereon during vulcanization of this material to the tire.

It is a further object of the present invention to provide for such an enclosure in which the edges thereof can be fluid-tightly sealed to a tire and the repair material thereon without the necessity of clamping or fastening the edges of the cover to the assembly for providing an air-tight seal.

It is yet an additional object of the present invention to provide for such an enclosure which will facilitate proper evacuation of air from the interior of the enclosure.

Finally, it is an object of the present invention to provide for such an enclosure which can be applied in a very expedient manner and which can be manufactured at very reasonable cost.

With these objects in view, the enclosure according to the present invention for fluid-tightly enclosing at least a portion of a tire to be repaired during vulcanization of a rubber portion thereto, mainly comprises a sheet of air-tight flexible material covering at least a portion of the tire and the rubber portion thereon, and closure means of flexible air-tight material extending along at least one of the edges of the sheet and forming along the edge an elongated free space adapted to be connected to evacuating means and this closure means has an outer edge portion of greater flexibility than a portion thereof at the edge of the sheet so that upon evacuation of air from the aforementioned free space the outer edge portion of the closure means will form an air-tight seal along the edge portion of the sheet while the elongated space will still be maintained to permit evacuation of substantially all air from beneath the sheet. The closure means may be fixedly connected to the edge portion of the sheet for instance by vulcanizing the same to the edge portion of the sheet, when the sheet and the closure means are both formed from rubber, or the closure means may also be integrally formed with and from the same material as the sheet. On the other hand, the closure means may be formed from a separate endless member which is superimposed on the edge portion of the sheet. In this case the closure means has preferably a sickle-shaped cross section and is superimposed along one edge portion of the sheet with a portion of the closure means engaging the outer surface of the edge portion and a portion of the closure means extending laterally beyond the edge portion of the sheet and forming along the edge portion an elongated free space adapted to be connected to evacuating means so that upon evacuation of air from the elongated space the outer edges of the closure means will be deflected against the surfaces beneath the same to form air-tight seals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partial cross section through a tire and overlapping edge portions of a sheet enclosing the tire and showing one modification of closure means at one edge portion of the sheet;

FIG. 2 is a partial cross section through an edge portion of the sheet and showing a different modification of closure means integrally formed with an edge portion of the sheet;

FIG. 3 is a partial cross section similar to FIG. 2 and showing a different type of closure means connected to an edge portion of the sheet;

FIG. 4a is a partial cross section similar to FIG. 1 and showing a closure means similar to that shown in FIG. 3 connected to the edge portion of the sheet;

FIG. 4b is a partial cross section similar to FIG. 4a and showing a further modification of the closure means at the edge portion of the sheet;

FIG. 5 is a partial cross section similar to FIG. 1 and showing a closure means similar to FIG. 4b in a slightly different application;

FIG. 6 is a cross section through a further modification of a closure means;

FIG. 7 is a cross section through a closure means similar to that shown in FIG. 6;

FIG. 8 is a cross section through the closure means shown in FIG. 5;

FIG. 9 is a partial cross section through a tire, the sheet covering the same and the closure means as shown in FIG. 8 applied to an edge portion of the sheet; and FIG. 10 is a partial cross section through a tire, the sheet covering the same and closure means along edge portions of the sheet and showing also the initial clamping of the closure means to the assembly.

FIG. 1 shows in a partial cross section part of a tire 1 to which a tread portion 2 is vulcanized preferably by means of a binding layer (not shown in FIG. 1) sandwiched between the outer worn surface of the tire 1 and the bottom surface of the tread portion 2. During vulcanization of the tread portion 2 to the tire 1 the assembly is enclosed in a sheet 3, partly shown in FIG. 1, of flexible air-tight material, for instance rubber. Closure means extend along the inner of the overlapping edge portions of the sheet 3 and the closure means shown in FIG. 1 are integrally formed with sheet 3 from the same flexible material, for instance rubber. The closure means shown in FIG. 1 comprise a ridge portion 4 projecting upwardly from the outer surface of the inner one of the overlapping edge portions of the sheet 3 and a lip portion 5 extending laterally to one side of the ridge portion 4 from the outer free end thereof. The upper surface of the lip portion 5 extends in unstressed condition upwardly inclined at an angle of substantially 45° to the edge portion of the sheet 3 to which it is connected by the ridge portion 4 and when the other edge portion of the sheet is placed in engagement with the upper surface of the lip portion 5 of the closure means, the lip portion will be deflected as shown in FIG. 1 to engage with a certain tension the inner surface of the outer one of the overlapping edge portions of the sheet 3. In this way the free space formed to the left of the ridge portion 4, as shown in FIG. 1, is air-tightly closed against the outside. Before vulcanization of the tread portion 2 to the tire 1, the free space to the left of the ridge portion 4 of the closure means is evacuated by connecting evacuating means thereto, for instance by a valve opening formed in a portion of the sheet 3 to the left of the ridge portion 4, as viewed in the drawing, and communicating with the free space formed to the left of the ridge portion 4. This valve opening is not shown in the drawing. When air is evacuated from the free space, the outer pressure will press the outer one of the overlapping edge portions of the sheet 3 further tightly against the upper surface of ridge and lip portions 4 and 5 to provide a perfect air-tight seal. At the same time, the free space extending all along the inner of the overlapping edge portions of the sheet 3 will also facilitate substantially complete evacuation of air from the interior of the sheet so that air enclosures during vulcanization of the tread portion 2 to the outer surface of the worn tire 1 will be avoided. After air is evacuated from the interior of the sheet, the whole assembly is placed in an autoclave in which under the application of heat and pressure the tread portion 2 is vulcanized to the outer surface of the worn tire 1. The sheet 3 may also be formed in such a way that it also covers the inside of the tire 1.

FIGS. 2–10 show modifications of the closure means according to the present invention differing from the above described modification shown in FIG. 1. In all modifications the closure means has an edge portion of greater flexibility than another portion thereof and the closure means is either integrally made, fixedly connected to or partly placed over an edge portion of the sheet 3 so as to form along this edge portion a free space which may be evacuated and in which during evacuation of the free space the edge portion of a greater flexibility of the closure means will be deflected into engagement with a portion of the sheet located beneath this edge portion or with a portion of the outer surface of the tire to thus form an air-tight seal.

FIG. 2 shows a modification in which the closure means 6 is integrally formed with and from the same flexible air-tight material, for instance rubber, as the sheet 3 and the closure means 6 forms a thickened portion along one edge portion of the sheet 3 and extends in form of a curved lip ending substantially in a knife edge beyond the edge face of the sheet 3 to form, when the left surface of the sheet 3 as viewed in FIG. 2, is placed against the outer surface of the tire, along the edge face of the sheet 3 an elongated free space enclosed by the edge face of the sheet 3, the lip of the closure means 6 and the tire surface between the edge face and the free edge of the lip portion of the closure means 6. This free space may be evacuated through the opening 9 formed in the lip portion of the closure means 6 by connecting evacuating means, not shown in the drawing, to this opening. During such evacuation, the edge face of the lip portion of the closure means 6 will be tightly pressed against the outer surface of the tire to thus form an air-tight seal along the edge of the sheet 3. In this case it is not necessary to enclose the whole outer surface of the tire by the sheet 3, but the sheet has to have an area only slightly greater than the layer of repair material placed on the tire surface during repair of the damaged tire by vulcanizing a patch of rubber thereto.

A different modification of the closure means is shown in FIG. 3 in which the closure means is formed from flexible air-tight material and has a substantially sickle-shaped cross section and which this closure means 7 is fixedly connected along one of the edges thereof for instance by vulcanization or by cementing to an edge portion of the sheet 3. The edge portion of the sheet 3 is preferably bent with respect to the remainder of the sheet so that an elongated free space, as described before, will be formed beneath the closure means 7 when the sheet and the closure means are applied against an outer surface portion of the tire. The closure means 7 is again formed between the edges thereof with at least one evacuation opening 9 for evacuating air from the free space in the manner as described before. During such evacuation the free unconnected edge of the closure means 7 will again be tightly sucked against the outer surface of the tire in the manner as described before to form an air-tight seal along the edge of the sheet 3.

FIG. 4a shows in a partial cross section the application of closure means, similar to that shown in FIG. 3, when the sheet 3 covers part of a portion of a tire 1 and a tread portion 2 placed on the outer surface of the worn tire. The sheet 3 extends all around the tread portion 2 and the edge portions of the sheet 3, only the left of which is shown in FIG. 4a, extend beyond the tread portion into engagement with the outer tire surface adjacent thereto. Fixedly connected to the edge portion of the sheet 3, by vulcanization or cementing, is a closure means 7 of a form similar to that shown in FIG. 3 and the lip of the closure means 7 forms again between its inner surface and the outer surface of the tire an elongated free space which may be evacuated through the opening 9 formed in the closure means in the manner as described before. During such evacuation the outer pressure acting on the closure means 7 will tightly press the free edge thereof against the outer surface of the tire to form thus along the edges of the sheet 3 an air-tight seal.

FIGS. 5–10 show further modification of the closure means. In all these figures the closure means are not fixedly connected to edge portions of the sheet 3, but are arranged in abutting relationship thereto. FIG. 8 shows such a closure means 8 formed from flexible air-tight material, for instance rubber, and the closure means 8 has a cross section of substantially sickle-shaped configuration. The closure means 8 is preferably formed intermediate the edges thereof with an air evacuation bore 9. FIGS. 4b, 5, 9 and 10 show different applications of the closure means 8 shown in FIG. 8. FIG. 4b is a cross section similar to FIG. 4a and showing a closure means 8 as described before abutting with a portion thereof on the outer surface of the edge portion of the sheet 3 used to enclose the tread portion 2 on the outer surface of the worn tire and part of the outer tire surface. The closure means 8 extend with a portion thereof beyond the edge portion of the sheet 3 to form beneath the inner surface of the closure means 8 an elongated free space extending along the edge of the sheet 3. This free space may be evacuated through the bore 9 in the manner as described before so that the atmospheric pressure will press the free edge of the closure means 8 tightly against the outer tire surface to thus form an air-tight seal. FIG. 4b shows also a layer of air-permeable material 10 sandwiched between the inner surface of the sheet 3 and the outer surface of tread portion 2 and tire 1 and extending in the arrangement shown in FIG. 4b from the aforementioned free space formed beneath the closure means 8 beyond the abutting surfaces of tire 1 and tread portion 2 thereon. This air-permeable layer 10 will facilitate evacuation of air from between the abutting surfaces of tread portion 2 and tire 1 during evacuation of air through the bore 9. This arrangement will positively prevent any air enclosures between tread portion 2 and tire 1 during vulcanization of the tread portion to the tire. It should be noted that in FIGS. 4a and 4b the sheet 3 covers only the tread portion on the tire and part of the outer tire surface adjacent the tread portion placed thereon.

FIG. 5 shows a cross section similar to FIG. 1 in which the sheet 3 covers the whole outer tire surface and the tread portion placed thereon. The arrangement shown in FIG. 5 differs also from that shown in FIG. 1 in that closure means 8 as described before are used to form an air-tight seal between the overlapping portions of the sheet 3. One portion of the closure means 8 overlaps the outer one of the overlapping edge portions of the sheet 3, whereas the remainder of the closure means 8 extends towards the right, as viewed in FIG. 5, of the edge face of the outer one of the overlapping edge portions of the sheet 3 to form beneath the closure means 8 an elongated endless air space which again may be evacuated in the manner as described before through the bore 9. An air-permeable layer 10 is sandwiched between the overlapping edge portions of the sheet 3 and this layer extends from the aforementioned free space beneath the closure 8 beyond the overlapping edge portions of the sheet 3 into engagement with the outer tire surface to facilitate evacuation of air beneath the sheet 3 during evacuation of air from the free space beneath the closure means 8.

FIG. 9 shows the application of a closure means 8 as described before to a sheet 3 which extends from the inner rim portion of the tire 1 all around the outer surface thereof and a tread portion 2 placed on the outer worn surface of the tire. FIG. 9 shows also in part a substantially conical member 13 used to hold the closure means 8 in engagement with the edge portion of the sheet 3 and the inner rim portion of the tire before evacuation of the air space beneath the closure means 8.

FIG. 10 shows the application of closure means 8 to edge portions of a sheet 3 during application of the enclosure according to the present invention on very large tires. In this case the closure means 8 are held at least temporarily against the edge portion of the sheet 3 by a curved disc 14 which in turn is held against the closure means 8 by clamps 15 engaging with opposite curved ends the disc 14 and the inner tire surface. The clamps 15 extend through the central opening of the tire only partially shown in FIG. 10. If very large tires have to be covered the sheet may be formed as shown in FIG. 10 out of two parts which overlap each other as shown at the upper right hand portion of FIG. 10. The overlapping portions may be formed with closure means as shown in FIG. 1 or the overlapping portions may be clamped or otherwise held against each other in any convenient manner. Of course the cover may also be formed by a single sheet 3 which is then preferably made into a configuration of U-shaped cross section.

FIGS. 6 and 7 respectively show closure means 11 and 12 which have a substantially X-shaped cross section having a central portion and two pairs of lip portions extending respectively to opposite sides of the central portion. The closure means 11 shown in FIG. 6 have substantially the form of two sickle-shaped closure means as shown in FIG. 8 connected together at the central portion thereof. The central portion of the closure means 11 is again formed with a bore 9 therethrough. The closure means 12 shown in FIG. 7 is similar to that shown in FIG. 6 with the exception that one pair of lip portions are slightly heavier than the other pair thereof. The closure means 6 and 7 are preferably used sandwiched between overlapping portions of a sheet 3. In this case the outer of the overlapping portions have to be formed with a valve opening therethrough which will be located in the assembly between the outer edges of the lips formed on the closure means 11 or 12. The closure means 11 and 12 are also formed from air-tight flexible material, for instance rubber.

It will be understood that each of the elements described above, or two or more together, may also find a useful application in other types of an enclosure differing from the types described above.

While the invention has been illustrated and described as embodied in enclosures for fluid-tightly enclosing at least a portion of a tire to be repaired during vulcanization of a rubber portion thereto, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an enclosure for fluid-tightly enclosing at least a portion of a tire to be repaired during vulcanization of a rubber portion to the tire, in combination, a sheet of air-tight flexible material covering at least said portion of said tire and said rubber portion thereon; and closure means of flexible air-tight material extending along at least one of the edges of said sheet and forming along said edge beneath said closure means an elongated free space adapted to be connected to evacuating means, said closure means having an outer edge portion of greater flexibility than a portion thereof at said edge of said sheet so that upon evacuation of air from said free space said outer edge portion of said closure means will form an air-tight seal along said edge portion of said sheet while said elongated space will still be maintained to permit evacuation of substantially all air from beneath said sheet.

2. In an enclosure for fluid-tightly enclosing at least a portion of a tire to be repaired during vulcanization of a rubber portion to the tire, in combination, a sheet of air-tight flexible material covering at least said portion of said tire and said rubber portion thereon; and closure means of flexible air-tight material extending along at least one of the edges of said sheet fixedly connected thereto and forming along said edge beneath said closure means an elongated free space adapted to be connected to evacuating means, said closure means having an outer edge portion of greater flexibility than a portion thereof at said edge of said sheet so that upon evacuation of air from said free space said outer edge portion of said closure means will form an air-tight seal along said edge portion of said sheet while said elongated space will still be maintained to permit evacuation of substantially all air from beneath said sheet.

3. In an enclosure for fluid-tightly enclosing at least a portion of a tire to be prepared during vulcanization of a rubber portion to the tire, in combination, a sheet of air-tight flexible material covering at least said portion of said tire and said rubber portion thereon; and closure means of flexible air-tight material integrally formed with and from the same material as said sheet, extending along at least one of the edges of said sheet and forming along said edge beneath said closure means an elongated free space adapted to be connected to evacuating means, said closure means having an outer edge portion of greater flexibility than a portion thereof at said edge of said sheet so that upon evacuation of air from said free space said outer edge portion of said closure means will form an air-tight seal along said edge portion of said sheet while said elongated space will still be maintained to permit evacuation of substantially all air from beneath said sheet.

4. In an enclosure for fluid-tight enclosing at least a portion of a tire to be repaired during vulcanization of a rubber portion of the tire, in combination, a sheet of air-tight flexible material covering at least said portion of said tire and said rubber portion thereon; and closure means integrally formed with and from the same material as said sheet and extending along one edge portion thereof, said closure means having a ridge portion projecting upwardly from the outer surface of said sheet and a lip portion extending to one side of said ridge portion from the outer free end thereof and adapted to engage with the other edge portion of said sheet when the latter envelops the tire, said closure means forming between said ridge portion and said other edge portion of said sheet an elongated space adapted to be connected to evacuating means and said lip portion forming with said other edge portion of said sheet an air-tight seal during evacuation of air from said elongated space while said elongated space will still be maintained to permit evacuation of substantially all air from beneath said sheet.

5. In an enclosure for fluid-tightly enclosing at least a portion of a tire to be repaired during vulvanization of a rubber portion of the tire, in combination, a sheet of air-tight flexible material covering at least said portion of said tire and said rubber portion thereon; and endless separate closure means of flexible air-tight material having a substantially sickle-shaped cross section and being superimposed along at least one edge portion of said sheet with a portion of said closure means engaging the outer surface of said edge portion of said sheet and a portion of said closure means extending beyond said edge of said sheet and forming along said edge beneath said closure means an elongated free space adapted to be connected to evacuating means so that upon evacuation of air from said elongated space the edge of said sickle-shaped cross section will form air-tight seals while said elongated space will still be maintained to permit evacuation of substantially all air from beneath said sheet.

6. An enclosure for fluid-tightly enclosing a tire to be repaired and a tread portion superimposed thereon during vulcanization of said tread portion to said tire comprising in combination, a sheet of air-tight flexible material enclosing said tire and said tread portion thereon, said sheet having a pair of overlapping edge portions; and endless separate closure means of flexible air-tight material sandwiched between said overlapping edge portions of said sheet, said closure means having a substantially X-shaped cross section having a central portion and two pairs of lip portions extending respectively to opposite sides of said central portion and engaging with thin edges thereof said overlapping edge portions of said sheet, respectively, to form a pair of elongated free spaces between said overlapping edge portions of said sheet and said endless closure means adapted to be connected to evacuating means so that upon evacuation of air from said free spaces said lip portions will form air-tight seals with said overlapping edge portions.

7. In an enclosure for liquid-tightly enclosing at least a portion of a tire to be repaired during vulcanization of a rubber portion to the tire, in combination, a sheet of air-tight flexible material covering at least said portion of said tire and said rubber portion thereon; and closure means of flexible air-tight material extending along at least one of the edges of said sheet and forming along said edge beneath said closure means an elongated free space, said closure means being formed spaced from said outer edge portion thereof with at least one bore therethrough communicating with said elongated space and adapted to be connected to air evacuating means, said closure means having an outer edge portion of greater flexibility than a portion thereof at said edge of said sheet so that upon evacuation of air from said free space said outer edge portion of said closure means will form an air-tight seal along said edge portion of said sheet while said elongated space will still be maintained to permit evacuation of substantially all air from beneath said sheet.

8. An enclosure for fluid-tightly enclosing a tire to be repaired and a tread portion superimposed thereon during vlucanization of said tread portion to said tire comprising, in combination, a sheet of air-tight flexible material enclosing said tire and said tread portion, thereon, said sheet having a pair of overlapping edge portions; and annular closure means of flexible air-tight material and of substantially sickle-shaped cross section extending along said overlapping edge portions and being superimposed with a portion thereof on the outer one of said overlapping edge portions of said sheet and extending with a lip portion thereof beyond the free edge of said outer one of said overlapping edge portions in engagement with the outer surface of said sheet laterally of said overlapping edge portions thereof to form beneath said closure means an annular free space adapted to be connected to evacuating means so that upon evacuation of air from said free space said lip portion will form an air-tight seal while said annular space will still be maintained to permit evacuation of substantially all air from beneath said sheet.

9. An enclosure for fluid-tightly enclosing a tire to be repaired and a tread portion superimposed thereon during vulcanization of said tread portion to said tire comprising, in combination, a sheet of air-tight flexible material enclosing said tire and said tread portion thereon, said sheet having a pair of overlapping edge portions; annular closure means of flexible air-tight material and of substantially sickle-shaped cross section extending along said overlapping edge portions and being superimposed with a portion thereof on the outer one of said overlapping edge portions of said sheet and extending with a lip portion thereof beyond the free edge of said outer one of said overlapping edge portions in engagement with the outer surface of said sheet laterally of said overlapping edge portions thereof to form beneath said closure means an annular free space adapted to be connected to evacuating means so that upon evacuation of air from said free space lip portion will form an air-tight seal while said annular space will still be maintained to permit evacuation of substantially all air from beneath said sheet; and an air permeable layer between said overlapping edge portions of said sheet and having one end edge bordering said free space to facilitate evacuation of air from beneath said sheet.

10. An enclosure for fluid-tightly enclosing an annular outer surface portion of a tire and an annular tread portion superimposed thereon during vulcanization of said tread portion to said tire comprising in combination, a sheet of air-tight flexible material enclosing said annular portion of said tire and said annular tread portion thereon, said sheet having a pair of edge portions extending beyond said tread portion; and a pair of closure means of flexible air-tight material extending along said edge portion of said sheet and forming along said edge portion and beneath said closure means elongated free space adapted to be connected to evacuating means, each of said closure means having an outer edge portion of greater flexibility than a portion thereof at the respective edge of said sheet so that upon evacuation of air from said free spaces said outer edge portion will form an air-tight seal along the respective edge portion of said sheet while said elongated space can still be maintained to permit evacuation of substantially all air from beneath said sheet.

11. An enclosure for fluid-tightly enclosing an annular outer surface portion of a tire and an annular tread portion superimposed thereon during vulcanization of said tread portion to said tire comprising in combination, a sheet of air-tight flexible material enclosing said annular portion of said tire and said annular tread portion thereon, said sheet having a pair of edge portions extending beyond said tread portion; a pair of closure means of flexible air-tight material extending along said edge portions of said sheet and forming along said edge portions and beneath said closure means elongated free spaces adapted to be connected to evacuating means, each of said closure means having an outer edge portion of greater flexibility than a portion thereof at the respective edge of said sheet so that upon evacuation of air from said free spaces said outer edge portion will form an air-tight seal along the respective edge portion of said sheet while said elongated space can still be maintained to permit evacuation of substantially all air from beneath said sheet; and a pair of air-permeable layers extending respectively from said free spaces beneath portions of said sheet adjacent said free spaces to facilitate evacuation of air from beneath said sheet.

References Cited by the Examiner

UNITED STATES PATENTS

| | | | |
|---|---|---|---|
| 723,945 | 3/03 | Tillinghast | 156—136 X |
| 2,441,097 | 5/48 | Hicks | 18—19 |
| 2,516,191 | 7/50 | Englesson. | |
| 2,966,936 | 1/61 | Schelkmann | 156—96 |
| 2,976,910 | 3/61 | Nowak | 156—91 |
| 3,126,582 | 3/64 | Scott | 18—19 |

FOREIGN PATENTS

| | | |
|---|---|---|
| 606,411 | 10/60 | Canada. |
| 555,690 | 9/43 | Great Britain. |
| 746,375 | 3/56 | Great Britain. |
| 92,699 | 6/59 | Netherlands. |

EARL M. BERGERT, *Primary Examiner.*